United States Patent
Chang

(10) Patent No.: US 9,246,339 B2
(45) Date of Patent: Jan. 26, 2016

(54) BATTERY AND CHARGING SYSTEM USING THE SAME

(71) Applicant: HON HAI PRECISION INDUSTRY CO., LTD., New Taipei (TW)

(72) Inventor: Ping-Chun Chang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 491 days.

(21) Appl. No.: 13/707,951

(22) Filed: Dec. 7, 2012

(65) Prior Publication Data

US 2014/0111149 A1   Apr. 24, 2014

(30) Foreign Application Priority Data

Oct. 24, 2012   (TW) .............................. 101139211 A

(51) Int. Cl.
| | |
|---|---|
| *H02J 7/00* | (2006.01) |
| *H01M 10/42* | (2006.01) |
| *H01M 10/44* | (2006.01) |
| *H01M 10/46* | (2006.01) |
| *H01M 10/48* | (2006.01) |
| *H02J 7/02* | (2006.01) |
| *H02J 17/00* | (2006.01) |

(52) U.S. Cl.
CPC ............... *H02J 7/00* (2013.01); *H01M 10/425* (2013.01); *H01M 10/441* (2013.01); *H01M 10/46* (2013.01); *H01M 10/48* (2013.01); *H02J 7/025* (2013.01); *H02J 17/00* (2013.01); *H01M 2010/4278* (2013.01)

(58) Field of Classification Search
USPC ......................................................... 320/108
See application file for complete search history.

(56) References Cited

U.S. PATENT DOCUMENTS

| | | | |
|---|---|---|---|
| 2002/0089305 A1* | 7/2002 | Park et al. ...................... | 320/108 |
| 2007/0029965 A1* | 2/2007 | Hui ................................ | 320/112 |
| 2009/0096413 A1* | 4/2009 | Partovi et al. ................. | 320/108 |
| 2011/0127953 A1 | 6/2011 | Walley et al. | |
| 2011/0156639 A1* | 6/2011 | Ryu et al. ...................... | 320/108 |
| 2011/0221391 A1* | 9/2011 | Won et al. ..................... | 320/108 |
| 2011/0241603 A1* | 10/2011 | Chang et al. .................. | 320/101 |

FOREIGN PATENT DOCUMENTS

| | | |
|---|---|---|
| CN | 102089952 | 6/2011 |
| CN | 102089952 A | 6/2011 |
| TW | 200843277 | 11/2008 |
| TW | 200915694 | 4/2009 |
| TW | 200915694 A1 | 4/2009 |
| TW | 201101642 | 1/2011 |

* cited by examiner

*Primary Examiner* — Yalkew Fantu

(74) *Attorney, Agent, or Firm* — Novak Druce Connolly Bove + Quigg LLP

(57) ABSTRACT

A battery includes a wireless unit, a battery unit, a charging unit, and a control unit. The wireless unit is configured to capture electromagnetic wave in the air. The charging unit is configured to convert the electromagnetic wave captured by the wireless unit to the charging current, and provide the charging current to the battery unit to charge the battery unit. The control unit is configured to detect a parameter value of the battery unit, control the wireless unit to capture the electromagnetic wave according to the parameter value of the battery unit, and further control the charging unit to convert the electromagnetic wave captured by the wireless unit to the charging current to charge the battery unit.

13 Claims, 3 Drawing Sheets

BATTERY AND CHARGING SYSTEM USING THE SAME

BACKGROUND

1. Technical Field

The present disclosure relates to batteries, and particularly to a battery capable of being charged through electromagnetic wave and a charging system using the battery.

2. Description of Related Art

A known method to charge a battery is to connect the battery to a mains supply through a mains supply interface. If the mains supply is not available, a battery may not be charged. Therefore, it is desired to provide a battery to resolve the above problem.

BRIEF DESCRIPTION OF THE DRAWINGS

The components in the drawings are not necessarily drawn to scale, the emphasis instead being placed upon clearly illustrating the principles of the battery and charging system using the same. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one".

Figure 1:
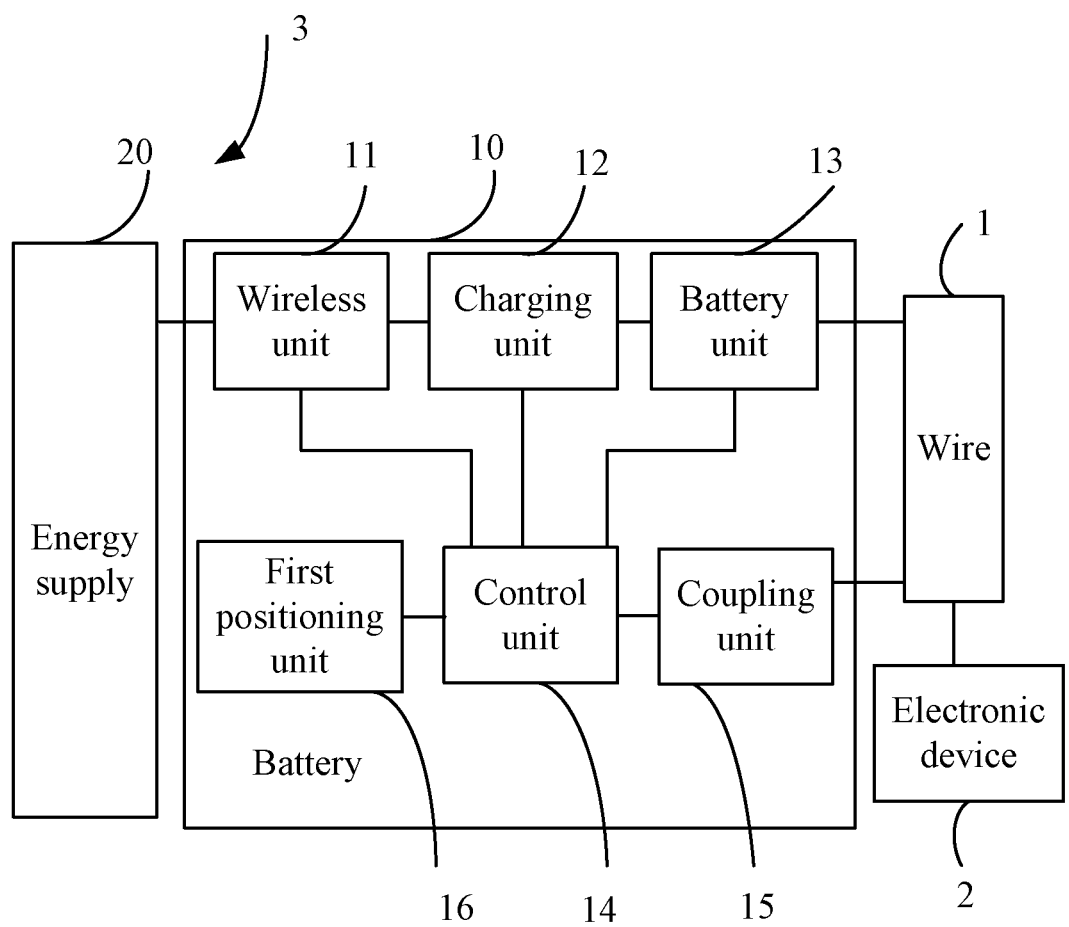
FIG. 1 is a block diagram of a charging system, in accordance with an exemplary embodiment.

Referring to FIG. 1, a battery 10 is shown in accordance with an exemplary embodiment. The battery 10 includes a wireless unit 11, a charging unit 12, a battery unit 13, and a control unit 14. The wireless unit 11 captures electromagnetic wave in the air. The charging unit 12 converts the electromagnetic wave captured by the wireless unit 11 to the charging current and provides the charging current to the battery unit 13 to charge the battery unit 13. The battery unit 13 is connected to an electronic device 1 through a wire 2 to provide power to the electronic device 1.

The control unit 14 controls the wireless unit 11 to capture the electromagnetic wave in the air and control the charging unit 12 to charge the battery unit 13. In detail, the control unit 14 detects a parameter value of the battery unit 13 and determines whether the parameter value of the battery unit 13 is less than a first predetermined parameter value, for example, 50 percent of the battery unit 13. If the parameter value of the battery unit 13 is less than the first predetermined parameter value, the control unit 14 controls the wireless unit 11 to capture the electromagnetic wave in the air and controls the charging unit 12 to convert the electromagnetic wave captured by the wireless unit 11 to the charging current to charge the battery unit 13. The control unit 14 further determines whether the parameter value of the battery unit 13 is less than a second predetermined parameter value, for example, 99 percent of the battery unit 13. If the parameter value of the battery unit 13 is greater than a second predetermined parameter value, the control unit 14 determines that the battery unit 13 has been fully charged and controls the wireless unit 11 to stop capturing the electromagnetic wave in the air. In the embodiment, the parameter of the battery unit 13 includes, but not limited to, battery unit level or battery unit voltage.

In the embodiment, the battery 10 further includes a coupling unit 15. The coupling unit 15 is connected between the control unit 14 and the wire 2. The coupling unit 15 converts the parameter value of the battery unit 13 to parameter signal and outputs the parameter signal to the electronic device 1 through the wire 2. Thus the electronic device 1 can display the parameter to show the state of the battery 10.

The wireless unit 11 further captures wireless signals. The battery 10 can communicate with another electronic device through the wireless unit 11. The battery 10 includes data interface to communicate with the electronic device 1, which the battery 10 is installed in. Thus, the electronic device 1 can communicate with another electronic device through the wireless unit 11 of the battery 10.

Figure 2:
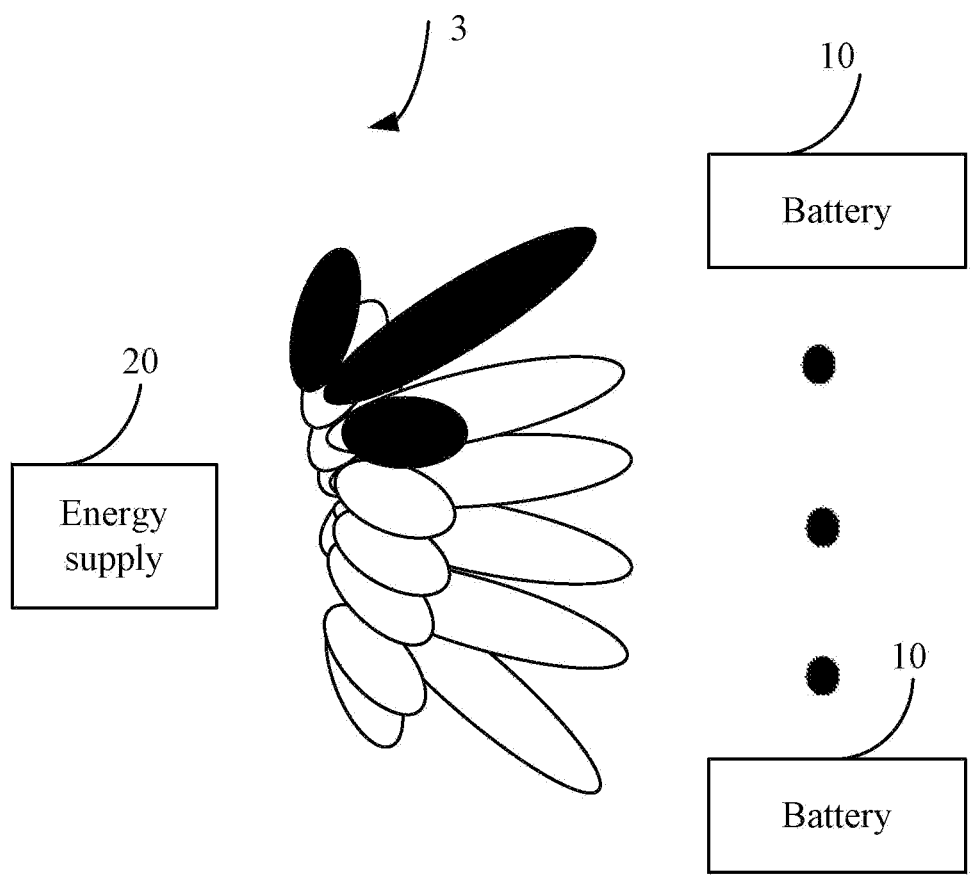
FIG. 2 is a schematic view showing the charging system of the FIG. 1, in accordance with an exemplary embodiment.

FIG. 2 shows a charging system 3 using the battery 10 in accordance with an exemplary embodiment. The charging system 3 includes an energy supply 20 and at least one battery 10. In one embodiment, one battery 10 is employed to illustrate the principle of the disclosure. The battery 10 further includes a first positioning unit 16. The first positioning unit 16 determines a geographical position of the battery 10. The energy supply 20 emits the electromagnetic wave.

Figure 3:
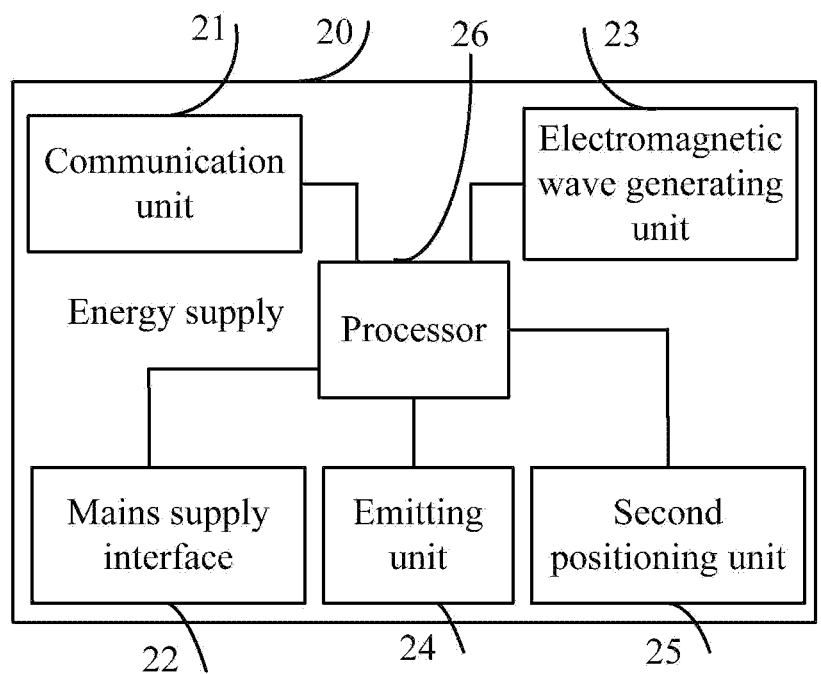
FIG. 3 is a block diagram of an energy supply of the charging system of the FIG. 1, in accordance with an exemplary embodiment.

Referring to FIG. 3, the energy supply 20 includes a communication unit 21, a mains supply interface 22, an electromagnetic wave generating unit 23, at least one emitting unit 24, a second positioning unit 25, and a processor 26. The communication unit 21 communicates with the wireless unit 11 of the battery 10. The mains supply interface 22 is connected to a mains supply to obtain power from the mains supply. Of course, the energy supply 20 can obtain power in other ways; for example, obtain power from a battery installed in the energy supply 20. The electromagnetic wave generating unit 23 converts the power to the electromagnetic wave. Each of the at least one emitting unit 24 emits the electromagnetic wave converted by the electromagnetic wave generating unit 23. The second positioning unit 25 determines a geographical position of the energy supply 20.

In a first embodiment, the control unit 14 detects the parameter value of the battery unit 13 in real time and determines whether the parameter value of the battery unit 13 is less than the first predetermined parameter value in real time. If the parameter value of the battery unit 13 is less than the first predetermined parameter value, the control unit 14 obtains the geographical position of the battery 10 from the first positioning unit 16, generates a charging signal including the geographical position of the battery 10, and transmits the charging signal including the geographical position of the battery 10 to the communication unit 21 of the energy supply 20 through the wireless unit 11. The processor 26 obtains the geographical position of the battery 10 from the charging signal, obtains the geographical position of the energy supply 20 from the second positioning unit 25, determines the orientation of the battery 10 relative to the energy supply 20 according to the geographical position of the battery 10 and the geographical position of the energy supply 20, and controls the at least one emitting unit 24 to emit the electromagnetic wave toward the determined orientation. Then, the battery 10 can execute the aforementioned charging processing.

In a second embodiment, the energy supply 20 controls the communication unit 21 to transmit an inquiring signal every a preset time. If the wireless unit 11 receives the inquiring signal, the control unit 14 detects the parameter value of the battery unit 13, and determines whether the parameter value of the battery unit 13 is less than the first predetermined parameter value. If the parameter value of the battery unit 13 is less than the first predetermined parameter value, the control unit 14 obtains the geographical position of the battery 10 from the first positioning unit 16, generates the charging signal including the geographical position of the battery 10, and controls the wireless unit 11 to transmit the charging signal including the geographical position of the battery 10 to the communication unit 21 of the energy supply 20. The energy supply 20 executes the aforementioned operation of determining the orientation of the battery 10 relative to the energy supply 20 and controlling the at least one emitting unit 24 to emit the electromagnetic wave toward the determined orientation.

Of course, the energy supply 20 can emit electromagnetic wave to a number of batteries. In detail, the processor 26 determines the orientation of each battery 10 relative to the energy supply 20 according to the geographical position of each battery 10 and the geographical position of the energy supply 20 and controls each emitting unit 24 to emit the electromagnetic wave toward one determined orientations.

In the embodiment, if the control unit 14 determines that the parameter value of the battery unit 13 is less than the first predetermined parameter value, the control unit 14 further determines whether the energy of the obtained electromagnetic wave is greater than a predetermined energy value. If the energy of the obtained electromagnetic wave is greater than the predetermined energy value, the control unit 14 controls the wireless unit 11 to capture the electromagnetic wave in the air and controls the charging unit 12 to convert the electromagnetic wave obtained by the wireless unit 11 to the charging current to charge the battery unit 13.

In the embodiment, during the operation of controlling the charging unit 12 to charge the battery unit 13, the control unit 14 obtains the geographical position of the battery 10 every predetermined time interval, generates a geographical position signal according to the geographical position of the battery 10, and controls the wireless unit 11 to transmit the geographical position signal to the communication unit 21 of the energy supply 20. The processor 26 compares the geographical position of the battery 10 with a previous geographical position of the battery 10 to determine whether the geographical position of the battery 10 changes. If the geographical position of the battery 10 changes, the processor 26 re-determines the orientation of the battery 10 relative to the energy supply 20 and controls the emitting unit 24 to emit the electromagnetic wave toward the orientation re-determined by the processor 26. Thus, even if the battery 10 is moved, the battery 10 can efficiently receive the electromagnetic wave emitted by the energy supply 20. If the geographical position of the battery 10 does not change, the processor 26 continuously controls the emitting unit 24 to emit the electromagnetic wave toward a previously determined orientation.

During the operation of the controlling the charging unit 12 to charge the battery unit 13, the control unit 14 further determines whether the energy of the electromagnetic wave captured by the wireless unit is less than the predetermined energy value. If the energy of the electromagnetic wave captured by the wireless unit is less than the predetermined energy value, the control unit 14 controls the wireless unit 11 to stop capturing the electromagnetic wave in the air. If the energy of the electromagnetic wave captured by the wireless unit is greater than the predetermined energy value, the control unit 14 controls the wireless unit 11 to continuously capture the electromagnetic wave in the air and controls the charging unit 12 to continuously charge the battery unit 13.

Thus, if the energy supply 20 cannot normally emit the electromagnetic wave, the charging unit 12 stops charging the battery unit 13.

It should be noted that the battery 10 need not only use the electromagnetic wave emitted by the emitting unit 24 of the energy supply 20, but also can use the electromagnetic wave emitted by other electronic devices, such as mobile phones, computers, and so on.

Although the current disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A battery comprising:
   a wireless unit configured to capture electromagnetic wave in the air;
   a battery unit;
   a charging unit configured to convert the electromagnetic wave, captured by the wireless unit to charging current, and provide the charging current to the battery unit, to charge the battery unit;
   a first positioning unit configured to determine a geographical position of the battery; and
   a control unit configured to detect a parameter value of the battery unit, obtain the geographical position from the first positioning unit, generate the charging signal including the geographical position, and control the wireless unit to transmit the charging signal including the geographical position and capture the electromagnetic wave according to the parameter value of the battery unit, and further control the charging unit to convert the electromagnetic wave captured by the wireless unit to the charging current to charge the battery unit.

2. The battery as described in claim 1, further comprising a coupling unit connected between the control unit and a wire, wherein the coupling unit is configured to convert the parameter value of the battery unit to parameter signal and output the parameter signal to an electronic device connected to the battery through the wire.

3. The battery as described in claim 1, wherein the control unit is further configured to determine whether the parameter value of the battery unit is less than a first predetermined parameter value; and when the parameter value of the battery unit is less than the first predetermined parameter value, the control unit is configured to obtain the geographical position of the battery from the first positioning unit, generate a charging signal comprising the geographical position of the battery, and control the wireless unit to transmit the charging signal comprising the geographical position of the battery to an energy supply.

4. The battery as described in claim 1, wherein the control unit is further configured to determine whether the parameter value of the battery unit is less than a first predetermined parameter value; when the parameter value of the battery unit is less than the first predetermined parameter value, the control unit is configured to determine whether the energy of the captured electromagnetic wave is greater than a predetermined energy value; and when the energy of the electromagnetic wave captured by the wireless unit is greater than the predetermined energy value, the control unit is configured to control the charging unit to charge the battery unit.

5. The battery as described in claim 1, wherein the wireless unit further captures wireless signals, and the battery is configured to communicate with external electronic devices through the wireless unit.

6. The battery as described in claim 1, wherein the control unit is further configured to determine whether the parameter value of the battery unit is greater than a second predetermined parameter value; and when the parameter value of the battery unit is greater than the second predetermined parameter value, the control unit is configured to determine that the battery unit has been fully charged and controls the wireless unit to stop capturing the electromagnetic wave in the air.

7. A charging system comprising:
an energy supply comprising:
a power interface connected to a mains supply to obtain a power from the mains supply;
an electromagnetic wave generating unit configured to convert the power obtained by the power interface to electromagnetic wave;
at least one emitting unit configured to emit the electromagnetic wave converted by the electromagnetic wave generating unit to the air; and
a processor configured to control each of the at least one emitting unit to emit the electromagnetic wave converted by the electromagnetic wave generating unit to the air; and
at least one battery, each of the at least one battery comprising:
a wireless unit configured to capture the electromagnetic wave in the air;
a battery unit;
a charging unit configured to convert the electromagnetic wave captured by the wireless unit to charging current, and provide the charging current to the battery unit to charge the battery unit; and
a control unit configured to detect a parameter value of the battery unit, control the wireless unit to capture the electromagnetic wave according to the parameter value of the battery unit, and further control the charging unit to convert the electromagnetic wave captured by the wireless unit to the charging current to charge the battery unit.

8. The charging system as described in claim 7, wherein each of the at least one battery further comprises a coupling unit connected between the control unit and a wire, to convert the parameter value of the battery unit to parameter signal and output the parameter signal to an electronic device connected to the battery through the wire.

9. The charging system as described in claim 7, wherein:
each of the at least one battery comprises a first positioning unit to determine a geographical position of the battery;
the energy supply comprises a second positioning unit and a communication unit, the second positioning unit is configured to determine a geographical position of the energy supply, the communication unit is configured to communicate with the wireless unit of the battery;
the control unit is configured to detect the parameter value of the battery unit in real time and determine whether the parameter value of the battery unit is less than a first predetermined parameter value in real time; and when the parameter value of the battery unit is less than the first predetermined parameter value, the control unit is configured to obtain the geographical position of the battery from the first positioning unit, generate a charging signal comprising the geographical position of the battery, and control the wireless unit to transmit the charging signal comprising the geographical position of the battery to the communication unit of the energy supply; and
the processor is configured to obtain the geographical position of the battery from the charging signal, obtain the geographical position of the energy supply from the second positioning unit, determine an orientation of the battery relative to the energy supply according to the geographical position of the battery obtained from the charging signal and the geographical position of the energy supply, and control the at least one emitting unit to emit the electromagnetic wave toward the orientation determined by the processor.

10. The charging system as described in claim 7, wherein when the control unit determines that the parameter value of the battery unit is less than a first predetermined parameter value, the control unit is further configured to determine whether the energy of the electromagnetic wave captured by the wireless unit is greater than a predetermined energy value; and when the energy of the electromagnetic wave captured by the wireless unit is greater than the predetermined energy value, the control unit is configured to control the wireless unit to capture the electromagnetic wave in the air and control the charging unit to convert the electromagnetic wave captured by the wireless unit to the charging current to charge the battery unit.

11. The charging system as described in claim 9, wherein:
during the operation of controlling the charging unit to charge the battery unit, each of the at least one control unit is configured to obtain the geographical position of the battery every predetermined time interval, generate a geographical position signal according to the geographical position of the battery, and control the wireless unit to transmit the geographical position signal to the communication unit of the energy supply;
the processor is configured to compare the geographical position of each of the at least one battery with a previous geographical position of each of the at least one battery to determine whether the geographical position of any one battery changes; and
when the geographical position of any one battery changes, the processor is configured to re-determine the orientation of the battery relative to the energy supply, and control the emitting unit to emit the electromagnetic wave toward the orientation as re-determined by the processor.

12. The charging system as described in claim 7, wherein:
during the operation of the controlling the charging unit to charge the battery unit, the control unit is further configured to determine whether the energy of the electromagnetic wave captured by the wireless unit is less than a predetermined energy value;
when the energy of the electromagnetic wave captured by the wireless unit is less than the predetermined energy value, the control unit is configured to control the wireless unit to stop capturing the electromagnetic wave in the air; and
when the energy of the electromagnetic wave captured by the wireless unit is greater than the predetermined energy value, the control unit is configured to control the wireless unit to continuously capture the electromagnetic wave in the air and control the charging unit to continuously charge the battery unit.

13. The charging system as described in claim 7, wherein the control unit is further configured to determine whether the parameter value of the battery unit is greater than a second predetermined parameter value; and when the parameter value of the battery unit is greater than the second predetermined parameter value, the control unit is configured to determine that the battery unit has been fully charged and control the wireless unit to stop capturing the electromagnetic wave in the air.

\* \* \* \* \*